United States Patent
Oishi et al.

(10) Patent No.: US 6,885,623 B1
(45) Date of Patent: Apr. 26, 2005

(54) RECORDING AND REPRODUCING METHOD OF INFORMATION RECORDING MEDIUM AND INFORMATION RECORDING AND REPRODUCING APPARATUS

(75) Inventors: Masami Oishi, Saitama (JP); Hidehiro Ishii, Saitama (JP); Jiro Endo, Saitama (JP); Katsumi Kawamura, Saitama (JP); Takeshi Kohda, Saitama (JP)

(73) Assignee: Pioneer Corporation, Tokyo (JP)

( * ) Notice: Subject to any disclaimer, the term of this patent is extended or adjusted under 35 U.S.C. 154(b) by 458 days.

(21) Appl. No.: 09/659,580

(22) Filed: Sep. 11, 2000

(30) Foreign Application Priority Data

Sep. 10, 1999 (JP) .......................................... P. 11-256959

(51) Int. Cl.[7] ................................................. G11B 5/09
(52) U.S. Cl. ................................. 369/53.37; 369/47.24; 369/53.2
(58) Field of Search ........................... 369/275.3, 275.4, 369/30.04–30.09, 47.27, 47.23, 47.24, 53.2, 53.24, 53.37, 94, 53.31, 53–35, 53.36

(56) References Cited

U.S. PATENT DOCUMENTS

| 5,914,917 A | 6/1999 | Bae |
| 6,310,854 B1 * | 10/2001 | Sato et al. ................ 369/275.3 |
| 6,424,615 B1 * | 7/2002 | Ishimura et al. .......... 369/275.3 |
| 6,449,231 B1 * | 9/2002 | Numata .................... 369/275.3 |
| 6,493,302 B1 * | 12/2002 | Takahashi ................ 369/275.3 |

FOREIGN PATENT DOCUMENTS

| EP | 0 825 602 A2 | 2/1998 |
| EP | 0 938 092 A2 | 8/1999 |
| EP | 0 942 426 A2 A3 | 9/1999 |

* cited by examiner

Primary Examiner—Thang V. Tran
(74) Attorney, Agent, or Firm—Sughrue Mion, PLLC

(57) ABSTRACT

Information recording is conducted in the form of the simple format. When the simple format is indicated, the recording control data is not recorded in a lead-in area LIA, and after the information to be recorded is recorded in a data recording area DRA, the recording control data is recorded in a recording manager area RMA and a lead-out area LOA, in the data recording area DRA, recording manager area RMA, lead-in area LIA, and lead-out area LOA, which are predetermined according to the standard format. Further, when the finalizing processing is indicated, by recording again the recording control data according to the standard format to the information recording medium in which the information recording is conducted according to the simple format, the information recording medium which can be applied to the common information recording and reproducing apparatus, is easily realized.

26 Claims, 10 Drawing Sheets

(A VIEW SHOWING THE STRUCTURE OF ECC BLOCK)

(A VIEW SHOWING THE STRUCTURE OF DATA SECTOR)

RECORDING AND REPRODUCING METHOD OF INFORMATION RECORDING MEDIUM AND INFORMATION RECORDING AND REPRODUCING APPARATUS

BACKGROUND OF THE INVENTION

The present invention relates to a method to record or reproduce the information by using an information recording medium into or from which the recording and reproducing of the information can be carried out, and to an information recording and reproducing apparatus using the method.

Conventionally, as an information recording and reproducing apparatus by which the recording and reproduction of the information can be carried out, it is well known that the VTR (Video Tape Recorder) spreads to common.

Because the VTR is a medium in which the information is recorded or reproduced to the magnetic tape as the information recording medium, there is a problem that the random access and the interactive editing can not be easily carried out.

For example, when the new information is to be written in the no-recorded area of the remaining portion of the magnetic tape, in a part of which the information is already recorded, because it is necessary to find the trailing edge position of the area, while monitoring, in which the information is already written and the start position of no-recorded area, there is a problem that a time is necessary for the pre-operation before the new information is recorded.

Further, even when the new information is to be written into a plurality of space areas of the magnetic tape in which the plurality of information is recorded at intervals between them, it is not necessarily easy that these space areas are effectively utilized for recording the information.

Recently, as the information recording medium by which such the problems of VTR can be solved, a disk type information recording medium such as a CD (Compact Disc), or DVD (Digital Video Disc or Digital Versatile Disc) is developed.

In these information recording media, a recording area to record the desired data (hereinafter, called data recording area) and a control area to record the recording control data are provided according to predetermined standards.

Further, in the disk type information recording medium, combined with a rapid engineering development, various types are successively developed. For example, in succession to a reproduction only DVD-ROM, a DVD-R by which the additional recording can be conducted, is developed, and further, an RVD-RW by which the recorded content can be re-written, is developed.

Herein, every time when the new kind of information recording medium is developed, when the respectively different independent format is adopted, the information recording medium which is stored from the previous time by the user can not be operated in the same manner as the newly developed information recording medium, which results in that the way to the effective utilization of the information resources is closed. Accordingly, in the control area, even for the different kind of the information recording medium, at the time of the reproduction of the information, the recording control data to enable the common reproduction is recorded.

For example, in the DVD to which the recording and reproducing can be conducted, the control area is compose of an R-Information Area, Lead-in Area, and Border-out/Lead-out Area (hereinafter, called lead-out area), and further, the R-Information Area is structured by a Power Calibration Area, and a Recording Management Area. However, when the content of the lead-in area and the lead-out area is equal to that of the reproduction only DVD-ROM, the compatibility of the reproduction can be secured.

Then, every time when the processing accompanied by the recording is conducted such as the new data is recorded in the data recording area, or the data recorded in the data recording area is edited, by writing again the predetermined recording control data in these control area, the control of the recording status is conducted.

Incidentally, the DVD to which the recording and reproducing can be conducted, described as one conventional example above, is remarked as a next generation information recording medium by which the random access or excellent interactive editing can be conducted, however, problems to be solved are remained yet.

In the VTR described above, because the magnetic tape is used, there is a problem in the operability for the random access or the interactive editing, however, for the user, there is also a phase in which it is simple at one view, but excellent in the basic operability, such that the recording start point and the recording end point for recording the data are intuitively and easily understood.

For example, in the case where the user picture-records the TV broadcasting, when the picture recording start position is previously set, there is an advantage that it can be intuitively understood that, by only pressing the picture recording start button at the desired screen, the picture recording is started from the picture recording start position. Further, there is an advantage that, when the desired screen ends, by only pressing the picture recording stop button, it can be intuitively understood that the picture recording is completed.

In contrast to this, in the DVD on which the recording and reproducing can be conducted, because the data recorded in the data record area is controlled according to the recording control data, for example, at the recording start of no-recorded disk, when the user indicates the picture recording start (recording start) or picture recording end (recording end), the recording control data is re-written (renewed) in all the area in the control area. Further, also for the recorded disk, a part of the led-in area, a part of the RMD, and the lead-out area are re-written (renewed) in a predetermined area.

Accordingly, the delay time for re-writing of the recording control data is generated, and there is a problem that the processing of the actual picture recording start or the actual picture recording end is delayed by a considerable time from the time point indicated by the user.

Incidentally, in the DVD on which the recording and reproducing can be conducted, the considerable delay time is necessary such as in a case in which the delay time from the time point at which the recording start is indicated to the time point at which the actual recording is started, is about 65 sec in the conversion of 1 time speed, and the delay time from the time point at which the recording end is indicated to the time point at which the recording actually ends, is about 60 sec–120 sec in the conversion of 1 time speed.

Accordingly, for the user, the time point at which the recording starts and the recording ends, can not be intuitively understood, therefore, there is sometimes a case in which the result that the operability is not necessarily good as compared to the VTR, is brought.

For example, as typically shown in FIG. 10A, when the user picture records the desired screen while monitoring the television broadcasting, because the actual picture recording is not started, when it is not after the time point tr at which a predetermined delay time (about 65 sec) is passed from the time point ts at which the picture recording start is indicated, there is a problem that the picture recording for the above delay time (about 65 sec) can not be conducted. Further, as shown in FIG. 10B, when the picture recording end is indicated, because the actual picture recording is not completed when it is not after the time point tf at which the predetermined delay time (about 60 sec–120 sec) passes from the time point te of the indication, there is a problem that the case where the operability consequently becomes poor occurs, because, when it is not after the time point tf of the recording completion of the recording control data, the DVD can not be taken from the information recording and reproducing apparatus, and the DVD can not be replaced with the new DVD.

SUMMARY OF THE INVENTION

The object of the present invention is to provide an information recording and reproducing method by which the delay time at the recording start and the recording end is greatly reduced, and for example, the increase of the operability for the user can be realized, and an information recording and reproducing apparatus using the method.

In order to attain the above object, an information recording and reproducing method and an information recording and reproducing apparatus of the information recording medium of the present invention are operated as follows: when the information is recorded according to a simple format, the recording control data, whose amount is smaller as compared to the predetermined recording control data according to a standard format, is recorded in the information recording medium. Further, the recording control data is recorded in a recording manager area and a lead-out area, in a data recording area, the recording manager area, a lead-in area, and the lead-out area, which are predetermined according to the standard format. Further, the recording control data for 32ECC blocks is recorded in the lead-out area.

According to these information recording and reproducing method and information recording and reproducing apparatus, when the information recording is conducted according to the simple format, because the recording control data whose amount is smaller than in the standard format, is recorded in the information recording medium, the processing of the recording start and the recording end of the information can be quickly conducted.

Further, when the finalizing processing is conducted on the information recording medium in which the information recording is conducted according to the simple format, the recording control data according to the standard format is recorded again.

According to these information recording and reproducing method and information recording and reproducing apparatus, the information recording medium in which the information recording is already conducted according to the simple format, can be set to the situation according to the standard format. Further, when the information recording is indicated, the information within the delay time necessary up to the actual recording start of the information is temporarily held, and the held information is recorded from the time of the actual recording start.

According to these information recording and reproducing method and information recording and reproducing apparatus, the information within the delay time from the time in which the information recording is indicated, to the time in which the actual recording is started, is temporarily held, and the held information is recorded from the time of the actual recording start. Thereby, the information in the delay time can be recorded without the information being omitted.

DETAILED DESCRIPTION OF THE PREFERRED EMBODIMENTS

Figure 1:
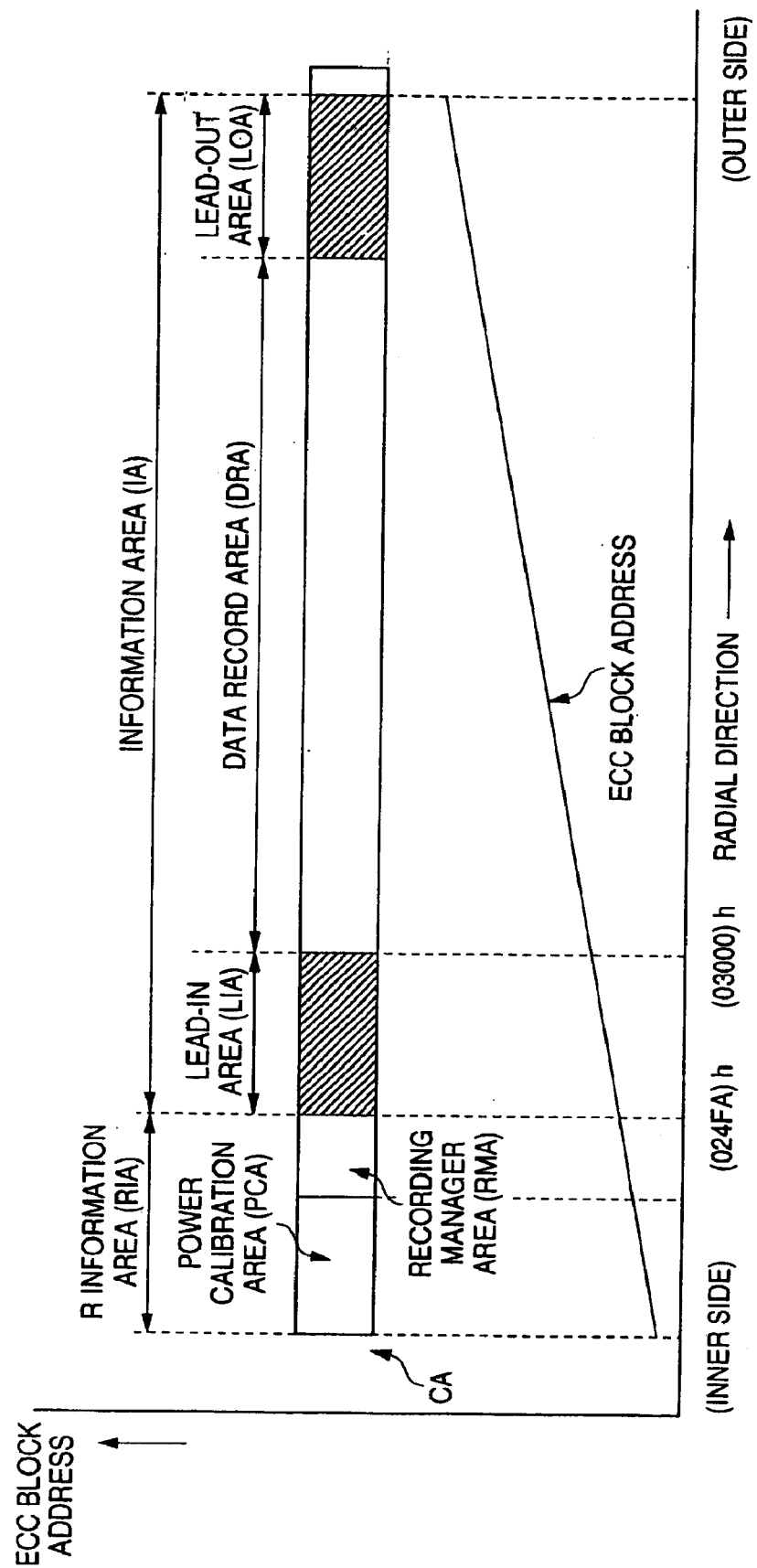
FIG. 1 is an illustration typically showing the data structure in the DVD in which the information recording and reproducing can be conducted, according to the present embodiment.

Referring to the drawings, the embodiment of the present invention will be described below. Incidentally, as one embodiment, an information recording and reproducing method in a DVD on which the information recording and information reproducing can be conducted, and an information recording and reproducing apparatus using the method will be described.

Figure 4:
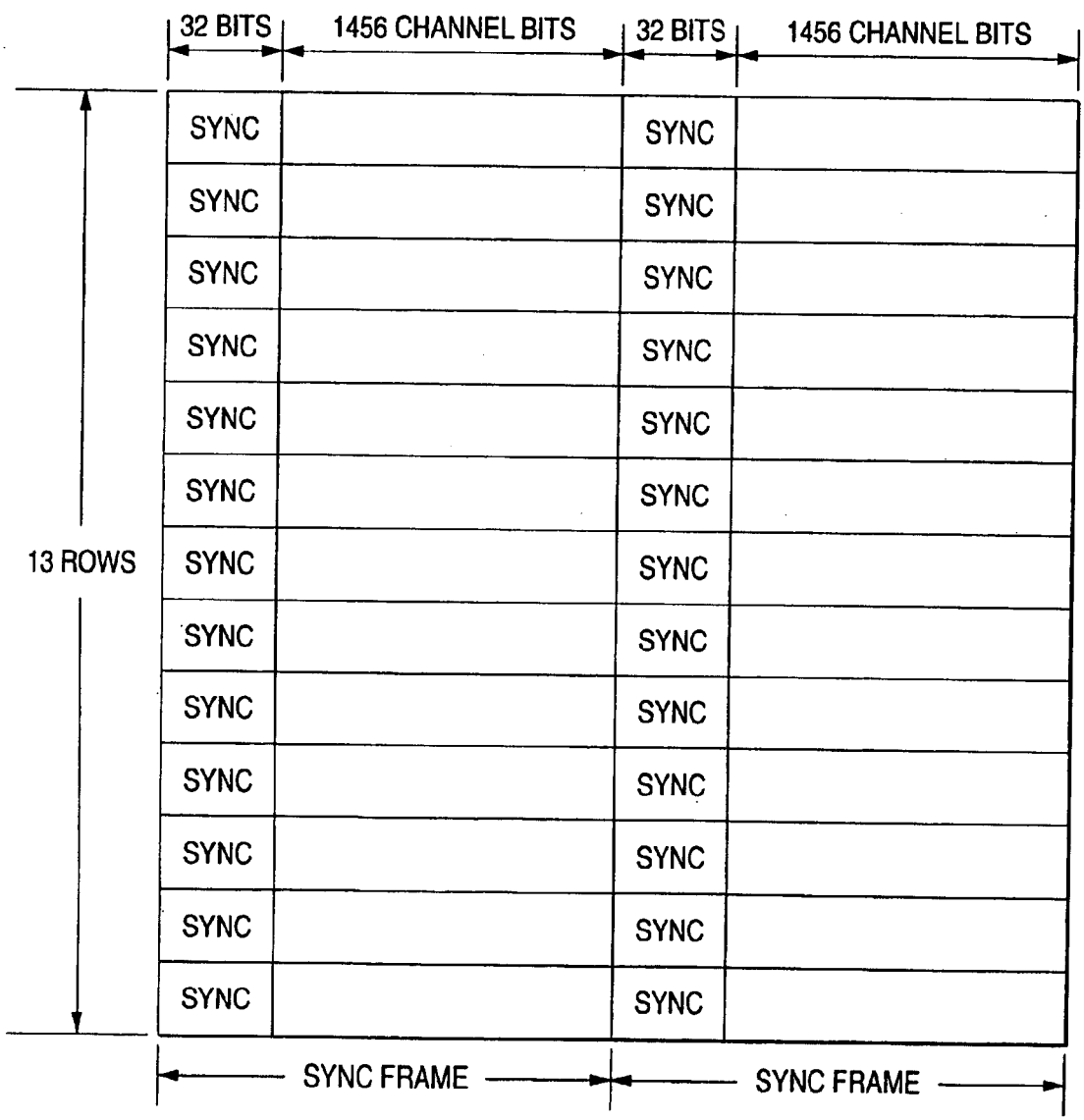
FIG. 4 is an illustration typically showing the structure of the recording data in the DVD in which the information recording and reproducing can be conducted, according to the present embodiment.
Figure 5:
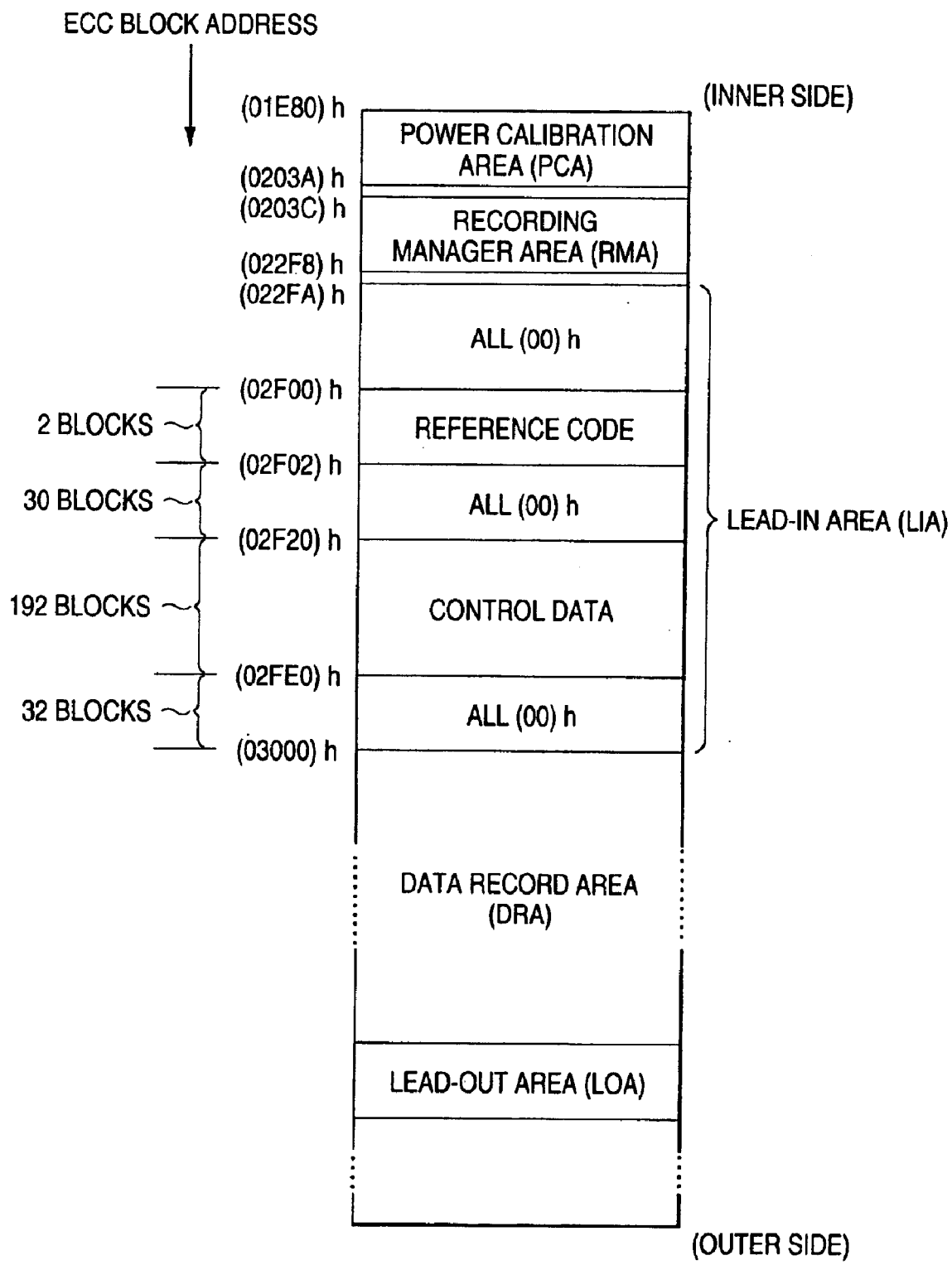
FIG. 5 is an illustration typically showing the structure of the recording control data in the DVD in which the information recording and reproducing can be conducted, according to the present embodiment.
Figure 6:
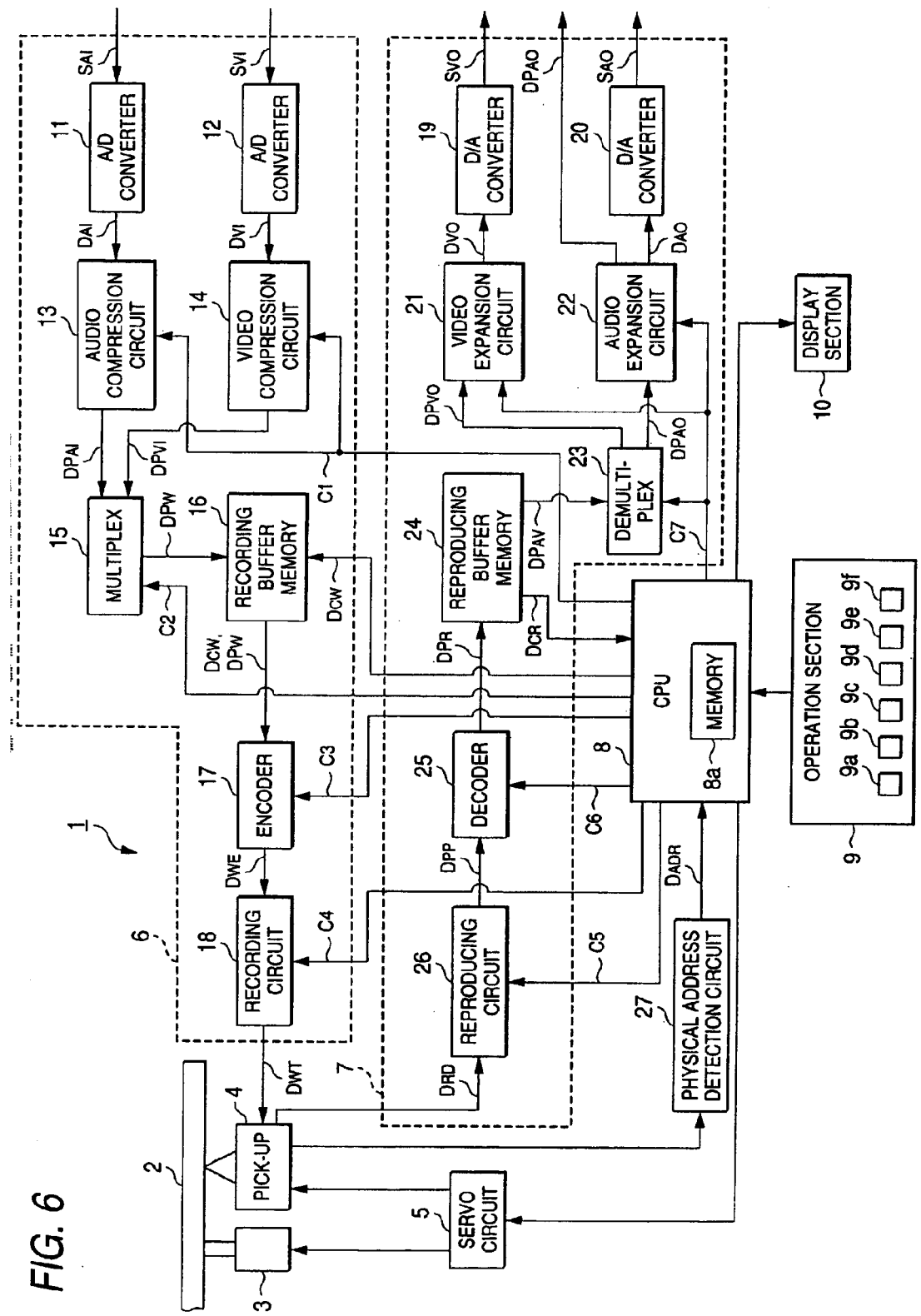
FIG. 6 is a block diagram showing the structure of the information recording and reproducing apparatus according to the present embodiment.

FIG. 1 to FIG. 5 are illustrations typically showing the data structure of the DVD (hereinafter, called disk) applied to the present embodiment, and FIG. 6 is a block diagram showing the structure of the information recording and reproducing apparatus according to the present embodiment.

In FIG. 1, in the disk, a groove and a land are spirally formed abound a clamping area CA, and in the groove and the land, a wobble and a land pre-pit, for regulating a physical address, are respectively formed.

According to the information of the wobble and land pre-pit, a pick-up of the information recording and reproducing apparatus is positioning controlled to the wobble, and the information recording (data writing) into the groove and the information reproducing (data reading) from the groove are conducted.

In the groove on which the data writing and data reading are conducted, an R-information area (RIA) and an information area (IA) are allotted from the inside of the radius direction (clamping area CA side) to the outside of the radius direction.

The R-information area RIA is structured by a power calibration area (PCA) and a recording management area (RMA), and the information area IA is structured by a lead-in area (LIA), data record table area (DRA), and lead-out area (LOA).

Herein, in the data record area DRA, each kind of contents data such as audio data or video data (hereinafter, called main data) and the file control information to control the contents data as a file, are recorded. The recording control data to show the recording status of the main data which is recorded in the data record area DRA, is recorded in the recording management area RMA, lead-in area LIA and lead-out area LOA.

The power calibration area PCA is provided in order to adjust the light amount of the pick-up so that the data writing can be conducted under the appropriate operation condition, by conducting the test writing, when the information recording and reproducing apparatus writes the data.

In the recording management area RMA, the recording control data to control the recording status of the lead-in, lead-out, and DRA is recorded.

In the lead-in area LIA, the recording control data to show the physical information of the disk is recorded.

The lead-out area LOA is provided in the end position of the main data recorded in the data record area DRA. In the lead-out area LOA, the lead-out information such as (00)h data is recorded. The recording start position of the lead-out area LOA changes corresponding to an amount of the data of the main data.

An area address of each of these areas PCA, RIA, LIA, DRA, and LOA, and a record address of the data are set according to the ECC block address physically determined according to the wobble and land pre-pit.

Figure 2:
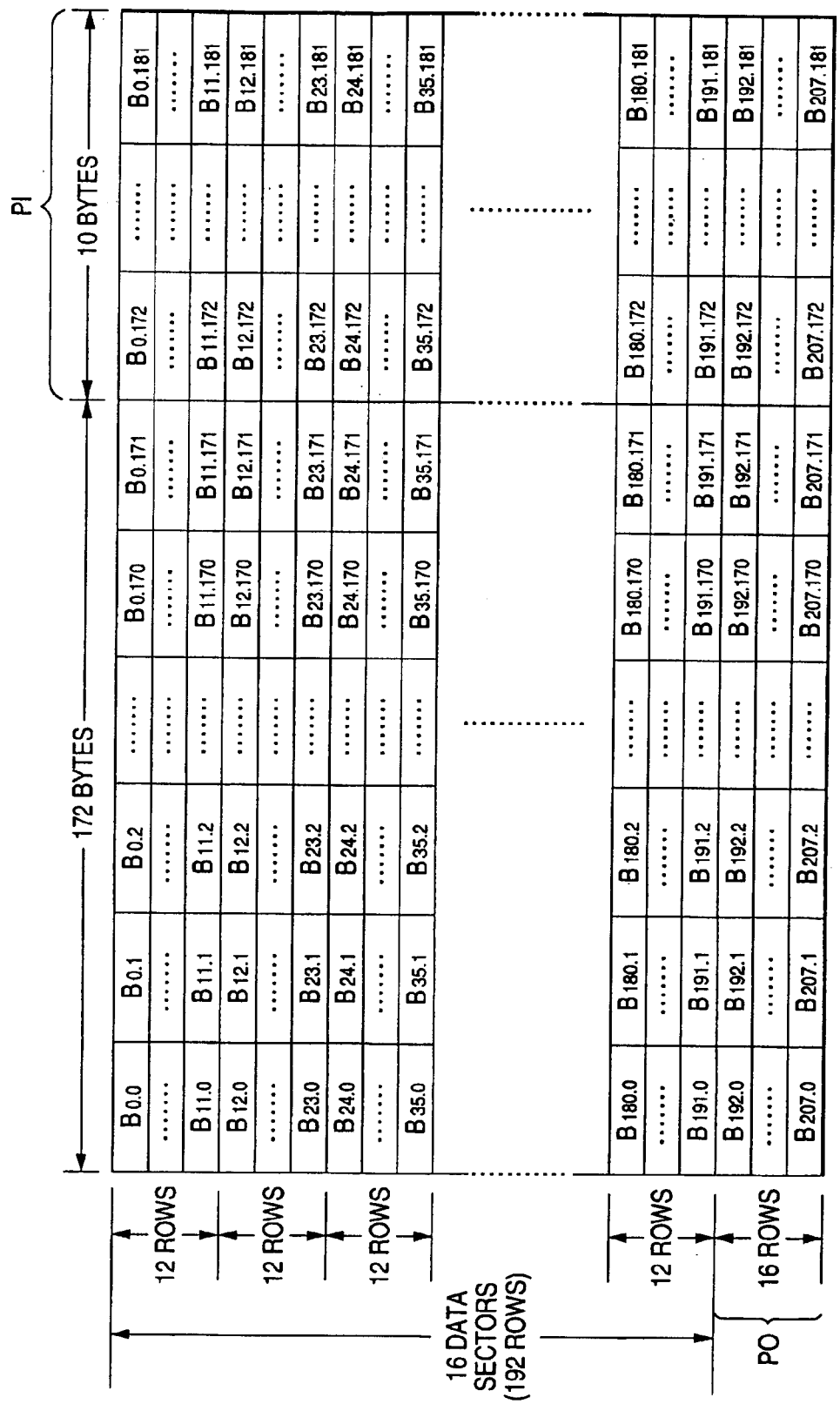
FIG. 2 is an illustration typically showing the structure of 1ECC block in the DVD in which the information recording and reproducing can be conducted, according to the present embodiment.

FIG. 2 is an illustration showing the structure of a single unit of ECC block, and the ECC block is structured by a data field, a PO field and PI field, added to the data field.

The data field is composed of 16 data sectors, and 1 data sector is composed of 12 rows, and further, each row is structured by 172 bytes. In other words, the number of the data of each row in the data field is set to 172 bytes, and a group of every 12 rows is called the data sector. Accordingly, in the data field, the data B0,0–B191, 171, that is, (172 bytes)×(12 rows)×(16 data sectors)=172 bytes)×(192 rows)= 33024 bytes, can be recorded.

The PO field is composed of 16 rows×172 bytes, and the outer-code parity data to conduct the data error correction in the longitudinal direction in the drawing, is recorded. That is, in the PO field, the outer-code parity data of 16 rows is recorded corresponding to 16 data sectors in the data field.

The PI field is composed of 208 rows×10 bytes, and the inner-code parity data to conduct the data error correction in the lateral direction in the drawing is recorded.

Figure 3:
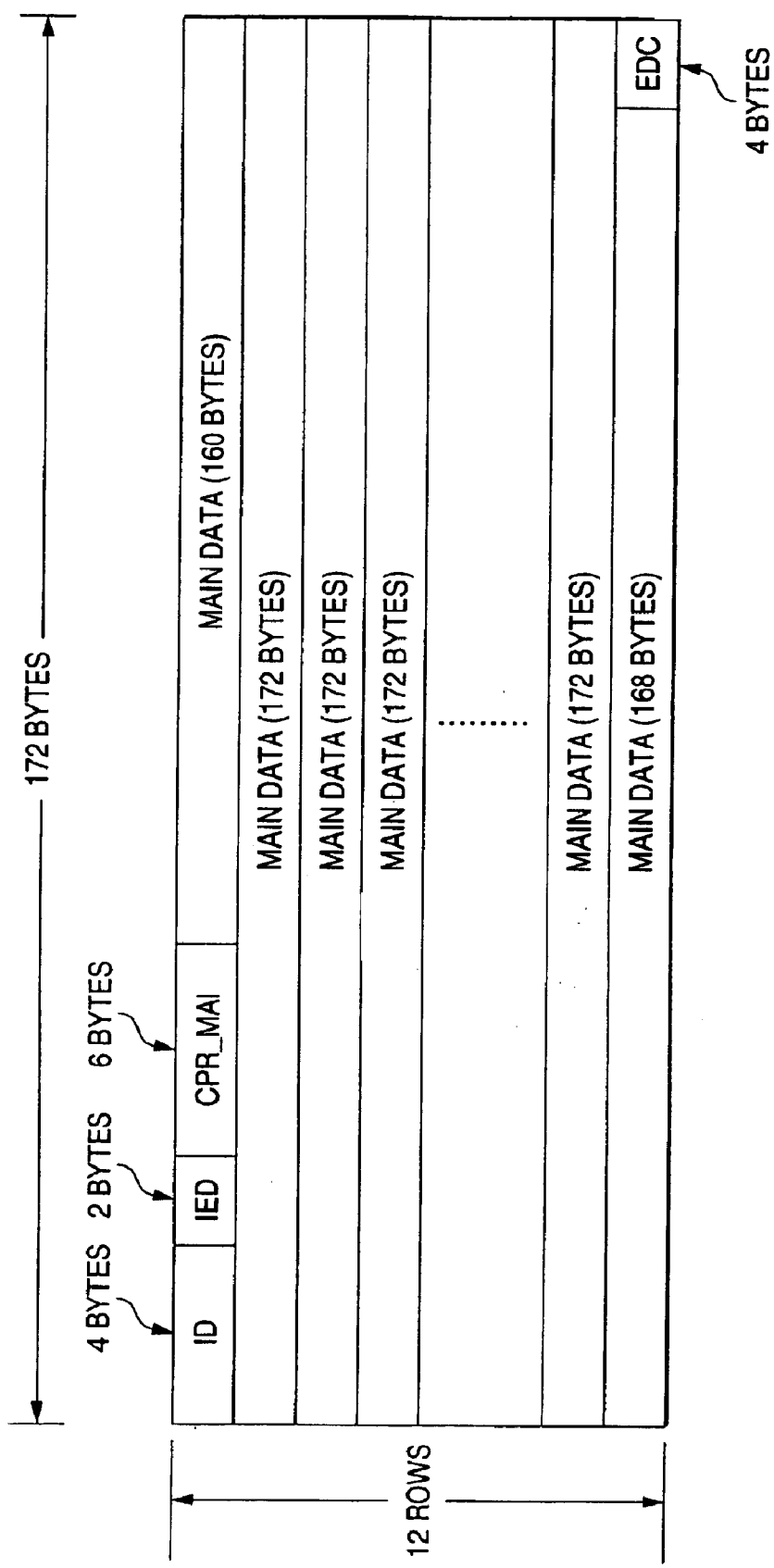
FIG. 3 is an illustration typically showing the structure of one data sector in the DVD in which the information recording and reproducing can be conducted, according to the present embodiment.

Further, FIG. 3 is an illustration typically showing the structure of 1 data sector in 16 data sectors constituting the data field. In the drawing, in 12 rows×172 bytes, the ID data (Identification data) is recorded in the leading 4 bytes, the IED data (ID Error Detection code data) is recorded in the next 2 bytes, and further CPR_MAI data (Copyright Management Information data) is recorded in the next 6 bytes, and the EDC data (Error Detection code data) is recorded in the trailing 4 bytes.

Then, the primary main data is recorded in a portion of. 2048 bytes from the next of the CPR_MAI data to the front of the EDC data.

Further, the data unit of 13 rows×182 bytes which is composed such that the outer code parity data of 1 row×172 bytes shown in FIG. 2, and the inner code parity data of 13 rows×10 bytes are added to this data sector, is called a recording sector.

Then, the data of 182 bytes (172+10 bytes) positioned in each row in FIG. 2, is divided into 2 sets of every 91 bytes, and the synchronous data SYNC is added to the top of every 91 byte data, and is 8/16-converted, thereby, as shown in FIG. 4 the data is recorded in the disk as the data in which 13 rows of a pair of the synchronous frames (SYNC frames) are provided.

Incidentally, the data of 91 bytes before it is 8/16-converted, is 728 bits, but, when the data of 91 bytes is 8/16-converted, it is converted into 1456 bits, and the bit unit after the 8/16 conversion is specifically called a channel bit.

As described above, 1 data sector is defined as 2048 bytes, and 1 ECC block is defined as 16 data sectors, and the area address and the data record address of each of areas PCA, RIA, LIA, DRA, and LOA are expressed by this EEC block unit. The EEC block is the error correction unit block.

Incidentally, as shown in FIG. 5, the power calibration area PCA is determined to an area from the ECC block address (01E80)h to (0203A)h. The recording management area RMA is determined to an area from the ECC block address (0230C)h to (022F8)h. The lead-in area LIA is determined to an area from the ECC block address (022FA)h to (02FFF)h. The data recording area DRA begins from the ECC block address (03000)h and the lead-out area LOA is determined to a predetermined range from the trailing end of the main data recorded in the data recording area DRA.

Further, the lead-in area LIA is provided with a reference code recording area allotted to an area for 2 ECC blocks from the ECC block address (02F00)h, and a control data recording area allotted to an area for 192 ECC blocks from the ECC block address (02F20)h.

Incidentally, although the detail will be described later, when the data writing is conducted in no-recorded disk according to the standard format, the recording control data is recorded and renewed in all the area (range) of the recording manager area RMA and the lead-in area LIA, shown in FIG. 5. Further, the data is recorded also in a predetermined range of the lead-out area LOA. Further, relating to the recorded disk, a part of the lead-in area, a part of the RMD, and the lead-out area are re-written (renewed) in a predetermined area.

On the one hand, when the data is written in no-recorded disk according to the simple format, the recording of the minimum RMA, the minimum LIA, and the lead-out of 32ECC block is conducted. Further, when the data writing into the recorded disk is conducted, the recording control data is not recorded (renewed) in the lead-in area LIA, and the recording control data of the recording manager area RMA and the lead-out area LOA is recorded (renewed) at need. Further, the lead-out area LOA is set to 32ECC blocks, and the data only for the 32ECC blocks is recorded.

Besides, the above described minimum RMA and the minimum LIA are explained in more detail as follows. RMA stores recording status information which shows a recording status of a disc. For example, what type is a recording method such as a write mode, or laser power or recording status of program area upon recording information. In a standard format, a predetermined data such as null data is recorded in an area wherein recording status information is not recorded. On the contrary, in a simple format, null data is not recorded in the area, but only the minimum PMA such as recording state information required for controlling of recording or reproducing are recorded.

Further, a physical characteristics of a disc or disc information such as data recording status is recorded in LIA. For example, a recording format, disc size, layer structure of disc, or data recording start point and end point are recorded.

Still further, LIA in a standard format is additionally provided with a predetermined data such as null data to improve tolerance of designing an information reproducing device.

On the contrary, LIA in a simple format does not record such as an additional data for an information reproducing device, but only writes the minimum LIA such as disc information.

Further, also when the finalizing processing is conducted, in the same manner as in the standard format, the recording control data is recorded in all the area of the recording manager area RMA and the lead-in area LIA shown in FIG. 5. Also in the lead-out area LOA, the data is recorded in a predetermined range.

Next, the structure of an information recording and reproducing apparatus 1 which records and reproduces the information by using the disk having such the data structure, will be described. Incidentally, as an example, an information recording and reproducing apparatus 1 by which the video information and audio information can be recorded and reproduced, will be described.

In FIG. 6, the information recording and reproducing apparatus 1 is provided with: a spindle motor 3 to clamp the disk 2 which is the information recording medium, and to rotate it at a predetermined line speed; a pick-up 4 to optically record (data writing) and reproduce (data reading) to the disk 2; and a servo circuit 5 to servo-control the spindle motor 3 and the pick-up 4.

Further, the information recording and reproducing apparatus 1 is structured by providing with: a recording system 6 for generating the data to be recorded in the disk 2; a reproducing system 7 for reproducing the data recorded in the disk 2; a central control circuit 8 for controlling the whole of the information recording and reproducing apparatus 1; an operation section 9 for the user to conduct a desired indication to the central control circuit 8; a display section 10; and a physical address detection circuit 27.

Herein, in the operation section 9, at least, an operation button switch 9a by which the user indicates the recording start, an operation button switch 9b for indicating the recording end, an operation button switch 9c for indicating the reproduction start, an operation button switch 9d for indicating the reproduction end, and an operation button switch 9f for indicating the finalizing processing, which will be described later, are provided.

The recording system 6 is structured by providing with A/D converters 11, 12, an audio compression circuit 13, video compression circuit 14, multiplex circuit 15, recording buffer memory 16, encoder 17 and recording circuit 18. Further, when the user operates the operation button switches 9a and 9b, and indicates the recording start and the recording end, the recording system 6 records the video information and the audio information supplied from the outside in the disk 2 together with the recording control data, in the period from the recording start to the end, according to the control signals C1, C2, C3 and C4 from the central control circuit 8.

Herein, the A/D converter 11 converts the analog audio signal SAI supplied from the outside into the digital audio data DAI, and outputs it.

The audio compression circuit 13 data compresses the audio data DAI according to a predetermined compression system indicated by the control signal C1 from the central control circuit 8, and supplies the data compressed audio data (hereinafter, called compression audio data) DPAI to the multiplex circuit 15. Incidentally, in the present embodiment, the linear PCM and the data compression method according to the AC-3 and the MPEG audio, are applied, and when the user operates the operation section 9, these compression systems can be arbitrarily indicated.

The A/D converter 12 converts the analog video signal SVI supplied from the outside into the digital video data DVI, and outputs it.

The video compression circuit 14 data compresses the video data DVI according to the MPEG 2 video format (ISO 13818-2), and the data compressed video data (hereinafter, called compressed video data) DPVI is supplied to the multiplex circuit 15.

By multiplexing the compressed audio data DPAI and the compressed video data DPVI, according to a predetermined timing specified by the control signal C2 from the central control circuit 8, the multiplex circuit 15 forms the data into the compressed data DPW on which the time division multiplex is conducted, and supplies it to the recording buffer memory 16.

The recording buffer memory 16 temporarily stores the compressed data DPW supplied from the multiplex circuit 15, conducts the timing adjustment on it, and sends it to the encoder 17 side.

The encoder 17 encodes the compressed data DPW supplied from the multiplex circuit 15 according to the control signal C3 from the central control circuit 8, and outputs the encoded data DWE generated thereby to the recording circuit 18.

The recording circuit 18 conducts processing such as power amplification, on the encoded data DWE, according to the control signal C4 supplied from the central control circuit 8, and supplies the recording data DWT generated thereby to the pick-up 4. Accordingly, the light source such as the semiconductor laser housed in the pick-up 4 is driven by the recording data DWT, and further, by the recording light emitted from the light source, the recording data DWT is optically recorded in the disk 2.

Herein, the recording buffer memory 16 not only temporarily stores only the compressed data DPW and sends to the encoder 17 side, but sends also the recording control data DCW for recording in the disk 2 to the encoder 17 side after conducting the timing adjustment.

That is, when the user operates the operation button switch 9a and indicates the recording start, corresponding to that, the central control circuit 8 makes the recording system 6 start the processing to record the video signal SVI and the audio signal SAI from just after the indication, and the central control circuit 8 checks up on the recording control data DCR already recorded in the disk 2 and distinguishes whether the disk is in no-recorded condition, and further, after the predetermined recording control data DCW is recorded in the disk 2, actually, the recording of the video signal SVI and the audio signal SAI is started.

Accordingly, even during the delay time td necessary for checking of the recording control data DCR already recorded in the disk 2, and further for the completion of the recording of the predetermined recording control data DCW in the disk 2, the compressed data DPW is supplied from the multiplex circuit 15 to the recording buffer memory 16. Therefore, when the compressed data DPW supplied from the multiplex circuit 15 during the delay time td is simply supplied to the encoder 17 side through the buffer memory 16, because the interference occurs between the compressed data DPW and the recording control data DCW, the recording buffer memory 16 holds the compressed data DPW supplied during the delay time τd to which the recording control data DCW is recorded in the disk 2, and the held compressed data DPW is sent to the encoder 17 side from just after the passage of the delay time τd, thereby, the interference is prevented.

Further, the recording buffer memory 16 does not collectively send all of the compressed data held within the delay time τd to the encoder 17 side, but in timed relationship with the supply timing of the video signal SVI and the audio signal SAI which are continuously supplied from the outside, the compressed data DPW is sent to the encoder 17 side successively from the older data in the time series, and the compressed data DPW of the video signal SVI and the audio signal SAI supplied during a period in which the completion of the recording after that is indicated, is also in timed relationship with the supply timing in the same manner, and is sent to the encoder 17 side.

Figure 7:
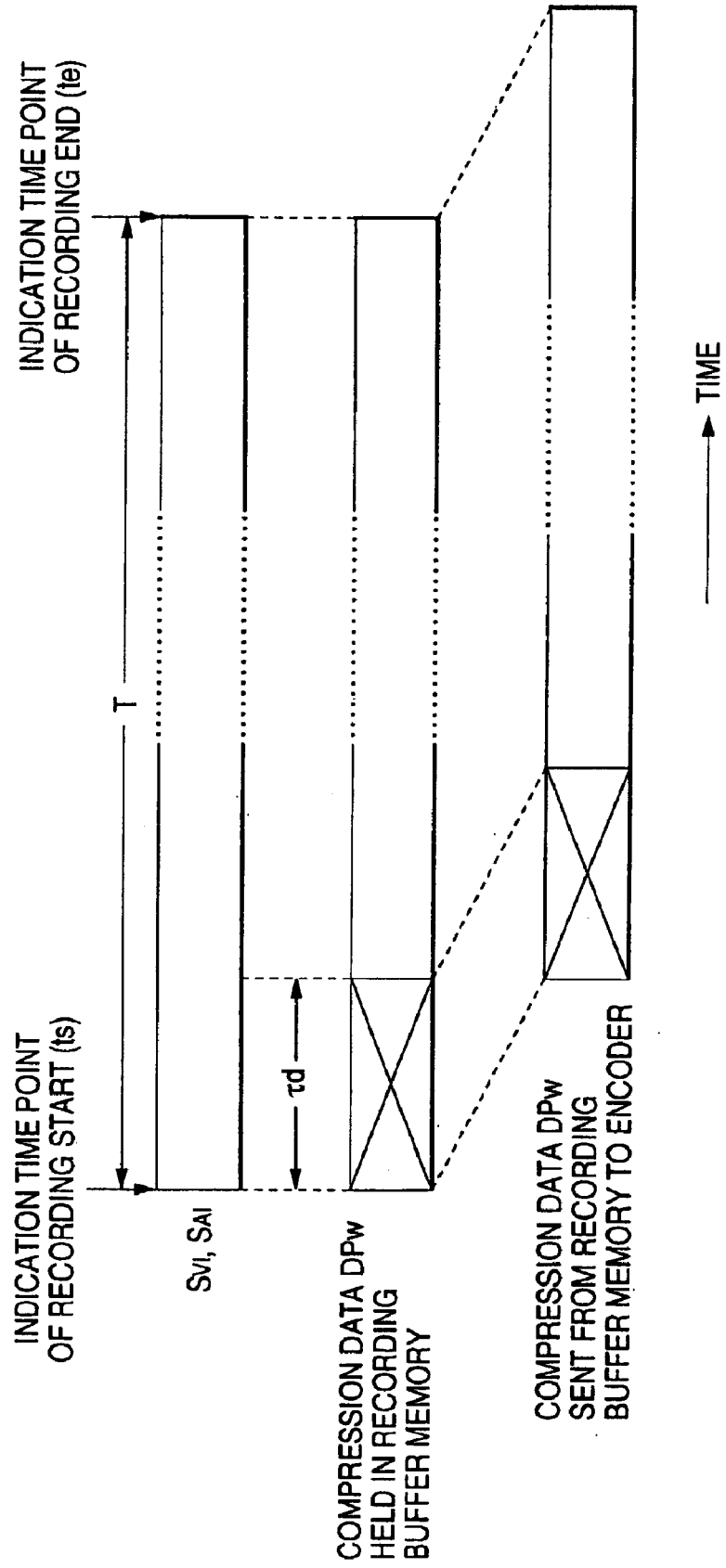
FIG. 7 is a timing chart showing the data recording timing of the information recording and reproducing apparatus according to the present embodiment.

Accordingly, as shown in FIG. 7, the recording buffer memory 16, to the video signal SVI and the audio signal SAI supplied from the outside during the period T from the time point ts in which the user indicates the recording start to the time point te in which the completion of the recording is indicated, continuously sends the compressed data DPW to the encoder 17 side by shifting it totally by the delay time τd. As the result, the video signal SVI and the audio signal SAI supplied during the period T can be recorded in the disk 2 without missing.

Further, although the delay of the delay time τd is generated, because the video signal SVI and the audio signal SAI are recorded from the time point ts in which the recording start is practically indicated, the problem that the picture recording for the delay time τd is not conducted as in the conventional techniques, is solved. For example, when the user conducts wiring and connecting such that the video signal SVI and the audio signal SAI of the television broadcasting received by the television set, are supplied to the present information recording and reproducing apparatus 1, and indicates the recording start at the desired time point ts while watching the reproduction image of the television set, the television broadcasting from the time point ts can be recorded in the disk 2 without missing.

Further, when the completion of the recording is indicated by the operation button switch 9b, after the central control circuit 8 makes all the compressed data DPW in the recording buffer memory 16 recorded in the disk 2, the recording control data DCW to show the recording completion is made to be recorded in the disk 2, and finally the recording processing is made to be completed. The recording control data DCW to show the recording completion is also supplied from the central control circuit 8 to the recording buffer memory 16, and is sent to the encoder 17 side through the recording buffer memory 16, thereby, it is recorded in the disk 2.

Incidentally, depending on the capacity of the recording buffer memory 16, there is a case where all of the delay time τd can not be absorbed, however, in such the case, the recording can be started at the minimum missing time.

Further, when the finalizing processing, which will be described later, is indicated by the operation button switch 9f, the central control circuit 8 supplies the recording control data DCW for the finalizing processing to the recording buffer memory 16, and by sending it to the encoder 17 side through the recording buffer memory 16, the recording control data DCW is recorded in the disk 2.

Incidentally, these recording control data DCW at the time of recording start, the recording control data DCW at the time of recording end, and the recording control data DCW at the time of finalizing processing pass through the encoder 17 and the recording circuit 18 shown in FIG. 6, and by being supplied to the pick-up 4 as the recording data DWT, these are recorded in the disk 2.

In FIG. 6 again, the reproducing system 7 is structured by providing with D/A converters 19, 20, the video expansion circuit 21, audio expansion circuit 22, demultiplex circuit 23, reproducing buffer memory 24, decoder 25 and reproducing circuit 26.

Herein, when the user operates the operation button switch 9c, the central control circuit 8 detects this, and makes the reproducing system 7 conduct the reproducing operation according to the control signals C5, C6 and C7, and when the user operates the operation button switch 9d, the central control circuit 8 detects this, and makes the reproducing system 7 stop the reproducing operation.

The reproducing circuit 26 waveform-shapes the detection signal (RF signal) DRD read from the disk 2 by the pick-up 4, according to the control signal C5 supplied from the central control circuit 8, and the binary reproducing data DPP generated by the waveform-shaping is outputted to the decoder 25.

The decoder 25 decodes (restores) the reproducing data DPP according to the control signal C6 supplied from the central control circuit 8, according to a predetermined decoding method corresponding to the encoding method of the encoder 17, and the decoded data DPR generated thereby, is supplied to the reproducing buffer memory 24.

The decode data DPR is inputted into the reproducing buffer memory 24, and the reproducing buffer memory 24 temporarily stores the decode data DPR, and re-arranges it to the decode data DPAV synchronized with a predetermined timing, and outputs it to de-multiplex circuit 23.

Incidentally, also when the user operates the operation button switch 9a and indicates the recording start to the recording system 6, the central control circuit 8 makes the reproducing circuit 26, decoder 25 and reproducing buffer memory 24 operate, in order to check up the recording control data DCR already recorded in the disk 2, and the reproduced recording control data DCR is inputted through the reproducing buffer memory 24.

Further, also when the user operates the operation button switch 9f and indicates the finalizing processing, the central control circuit 8 operates the reproducing circuit 26, decoder 25 and reproducing buffer memory 24, in order to check up the recording control data DCR already recorded in the disk 2, and the reproduced recording control data DCR is inputted through the reproducing buffer memory 24.

The de-multiplex circuit 23 de-multiplexes the data DPVO about the video information and the data DRAO about the audio information, which are time division-multiplexed in the decode data DPAV according to the control signal C7 supplied from the central control circuit 8. Then, respectively, the data DPVO is supplied to the video expansion circuit 21, and the data DPAO is supplied to the audio expansion circuit 22.

The video expansion circuit 21 conducts a predetermined expansion processing corresponding to the compression method of the video compression circuit 14 on the data DPVO which is the video information, according to the control signal C7 supplied from the central control circuit 8, thereby, the expanded video data DVO is outputted.

The audio expansion circuit 22 conducts a predetermined expansion processing corresponding to the compression method of the audio compression circuit 13 on the data DPAO which is the audio information, according to the control signal C7 supplied from the central control circuit 8, thereby, the expanded audio data DAO is generated and outputted.

The D/A converter 19 converts the expanded video data DVO into the analog video signal SVO and outputs it. The D/A converter 20 converts the expanded audio data DAO into the analog audio signal SAO and output it. Further, the data DPAO of the audio information is outputted to the outside as the digital data as it is.

The physical address detection circuit 27 inputs the detection signal of the reflected light from the groove and land pre-pit of the disk 2 detected by the pick-up 4 at the time of the recording and reproducing, and the detection signal is waveform-shaped and binarized, and thereby, generates the address detection signal DADR expressing the physical address, and supplies it to the central control circuit 8.

The central control circuit 8 is structured by providing with a memory 8a to previously store the preset system program, and a microprocessor (CPU) to control the operation of whole recording and producing apparatus 1 by conducting the system program.

That is, the central control circuit 8 controls the operations of the servo circuit 5, recording system 6 and reproducing system 7 by the microprocessor, and receives the indication of the user through the operation section 9, and further, makes the display section 10 display the content of the present operation of the recording and reproducing apparatus 1, each kind of information relating to the recording information or reproducing information, and the menu display to present the operation method of the recording and reproducing apparatus 1 to the user. Further, according to the address detection signal DADR from the physical address detection circuit 27, the central control circuit 8 synchronously controls the servo circuit 5, recording system 6, and reproducing system 7, and according to the ECC block address shown in FIG. 1, conducts the recording and reproducing to the disk 2.

Next, referring to FIG. 8 and FIG. 9, an example of the operations of the information recording and reproducing; apparatus 1 having such the structure, will be described. Incidentally, FIG. 8 is a flow chart showing the operation at the time of recording, and FIG. 9 is a flow chart showing the operation at the time of finalizing processing.

Figure 8:
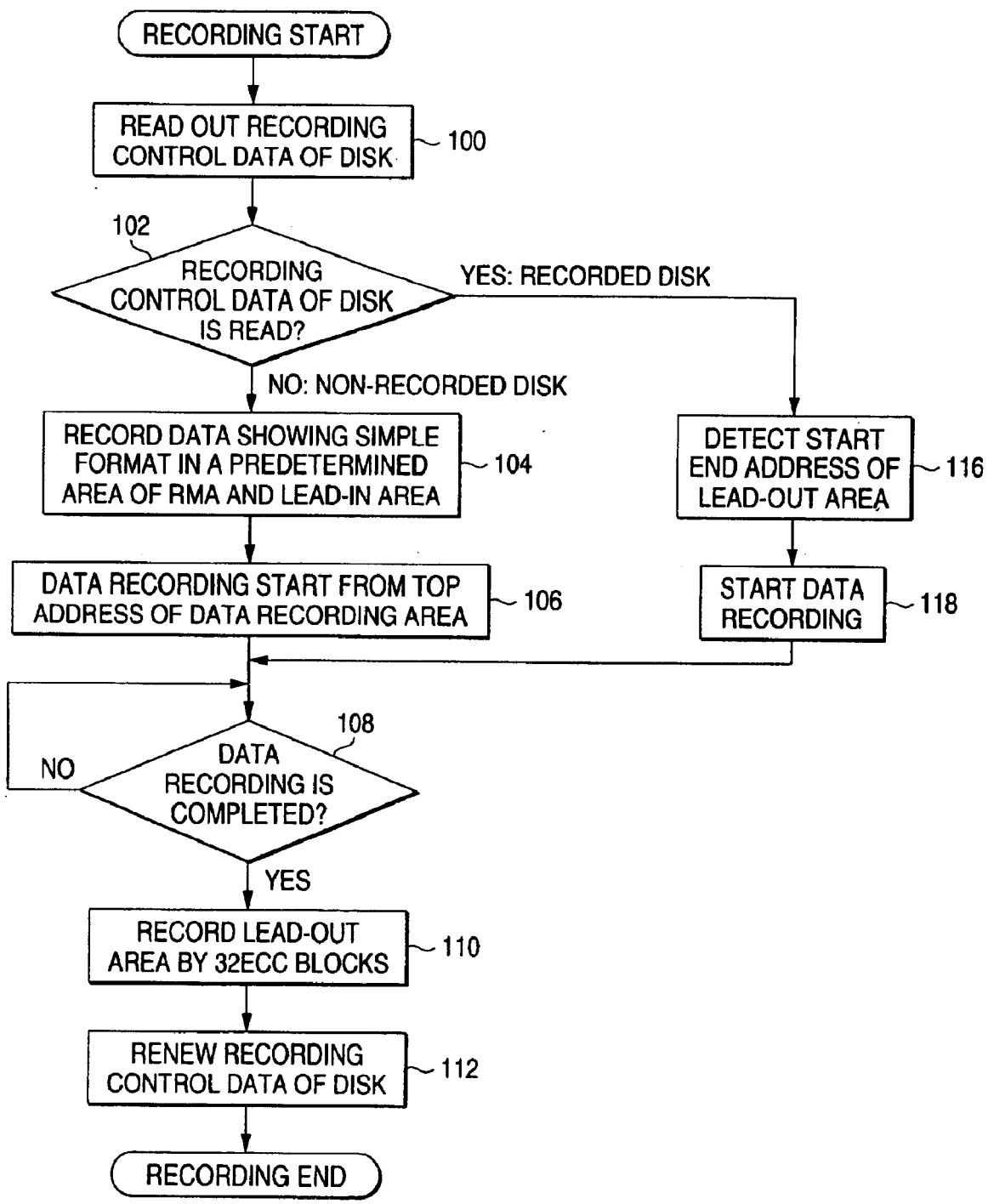
FIG. 8 is a flow chart for explaining each of operations in the case where the data recording is conducted in the no-recorded DVD, the case where the data recording is conducted according to the standard format, and the case where the data recording is conducted according to the simple format, in the information recording and reproducing apparatus according to the present embodiment.
Figure 9:
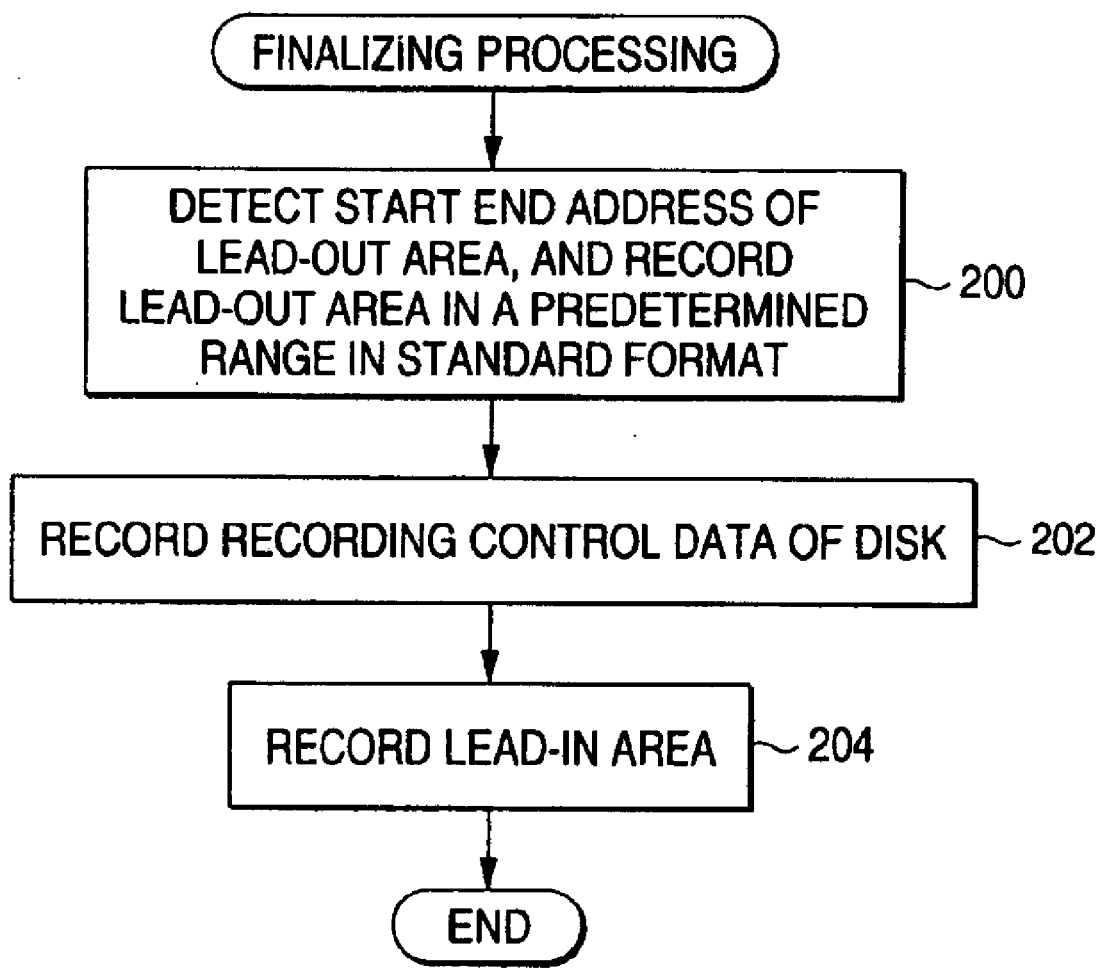
FIG. 9 is a flow chart for explaining the operation in the case where the finalizing processing is conducted, in the information recording and reproducing apparatus according to the present embodiment.
Figures 10A, 10B:
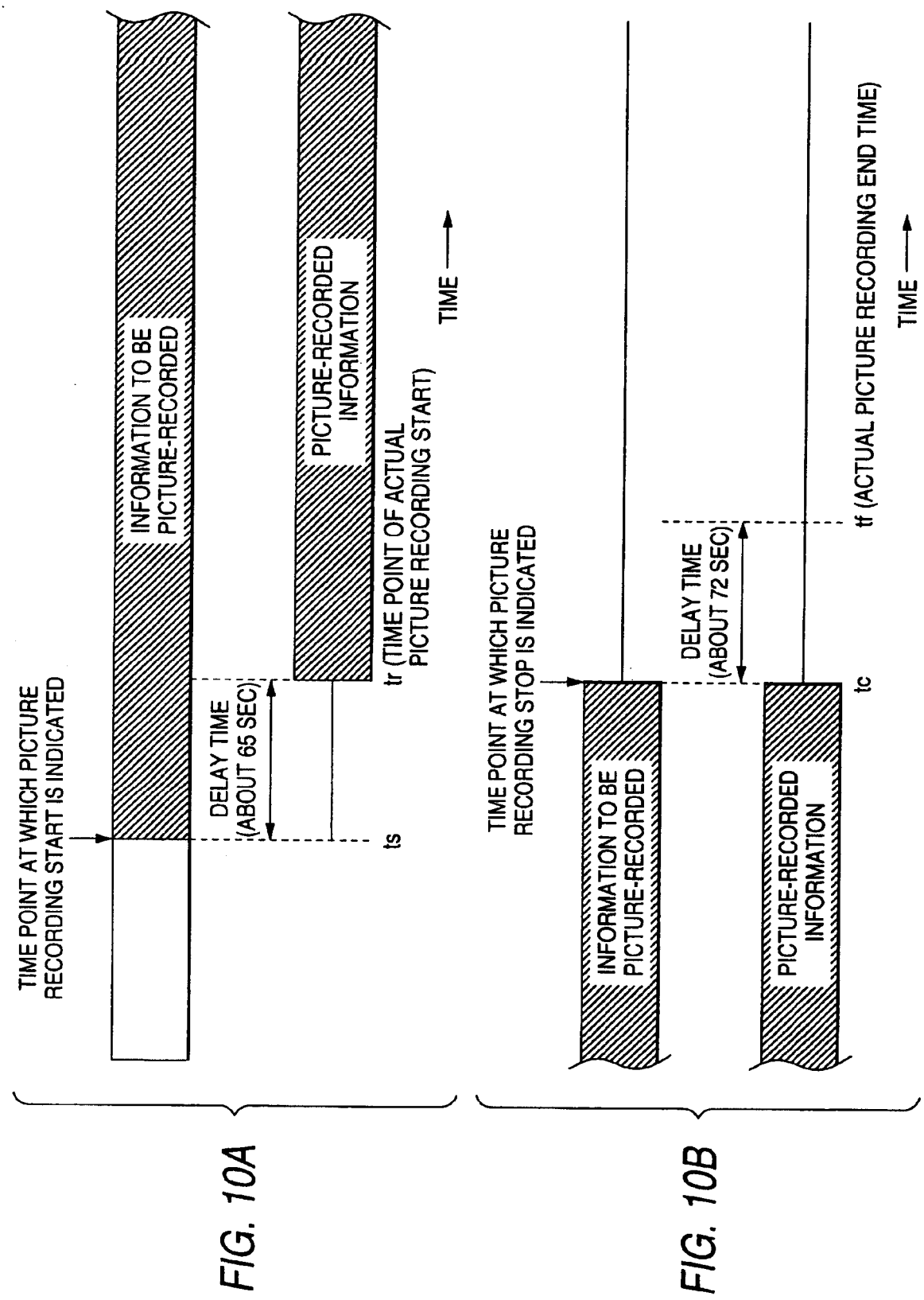
FIGS. 10A and 10B are illustration for explaining problems of the conventional information recording and reproducing apparatus.

In FIG. 8, the user loads the disk 2 into the present information recording and reproducing apparatus 1, and when the recording start is indicated by the operation button 9a, the recording operation is started according to the simple format.

Initially, in step 100, the recording control data DCR already recorded in the disk 2 is read out, and next, in step 102, the central control circuit 8 judges whether the recording control data DCR can be read out. Herein, when the recording control data DCR can not be read out, the loaded disk 2 is judged to be a new disk which is not formatted at all, and the sequence advances to the processing in step 104. On the one hand, when the recording control data DCR can be read out, the loaded disk 2 is judged to be the disk formatted already, and the sequence advances to the processing in step 116.

In the step 104, the data showing the simple format is recorded in a predetermined area of the RAM and lead-in area LIA shown in FIG. 1 and FIG. 5.

Incidentally, in the processing of no-recorded disk, the processing in this step 104 may be simultaneously conducted with that in step 112, which will be described later.

In the standard format, because the recording control data DCW is recorded within all the area of the lead-in area LIA, even only a time necessary for this processing, the delay time τd of about 65 sec converted into 1 time speed is generated. On the one hand, in the simple format, the processing time of about 5 sec is sufficient.

In step 106, after the recording of the above control data has been completed, the recording of the main data is started from the leading address of the data recording area DRA, that is, in the case of the new disk, from the ECC block address (3000)h (in sector address, (30000)h ).

Next, in step 108, it is judged whether the recording end is indicated by the operation button switch 9b, and when the operation of the recording end is conducted, the sequence advances to step 110.

In step 110, the lead-out area LOA of the 32ECC blocks is recorded successively from the end address of the main data recorded in the data recording area DRA.

Incidentally, the lead-out area LOA is not limited to the 32ECC blocks, but when the start end address of the lead-out area LOA is detected in step 116, which will be described later, it is necessary that the record length so long as the pick-up does not go out to the no-recorded area, is assured. On the one hand, in order to shorten the recording time, the shorter record length is preferable. Normally, the record length of integer times of 1 ECC block is convenient.

Incidentally, in the standard format, the recording time of the lead-out area LOA changes corresponding to a value of the end address of the main data, however, generally, the necessary time is about 45 sec–130 sec. On the one hand, in the present simple format, about 0.5 sec is adequate.

Next, in step 112, after the recording control data DCW relating to the main data recorded in the data recording area DRA is recorded in the recording manager area RMA, the data recording in the case where the new disk 2 is loaded in the present information recording and reproducing apparatus 1, ends. Incidentally, depending on the recording size of the main data, there is sometimes a case where this step 112 is not conducted.

Next, in the above step 102, when it is judged that the already formatted disk 2 is loaded, the sequence advances to the processing of step 116.

In step 116, the tail end of the already recorded main data in the data recording area DRA, that is, the address of the start end of the lead-out area LOA is detected. Next, in step 118, the recording of the main data is started from the address of the start end of the lead-out area LOA. That is, new main data is recorded from the next address of the already recorded main data.

Next, in step 108, it is judged whether the user operates the operation button switch 9b and the recording end is indicated, and when the recording end is operated, the sequence advances to step 110.

Next, referring to FIG. 9, the operation of the finalizing processing will be described.

In FIG. 9, when the user operates the operation button switch 9f, the operation of the finalizing processing starts. Initially, in step 200, the tail end of the already recorded main data in the data recording area DRA, that is, the address of the start end of the lead-out area LOA is detected. Further, the lead-out area LOA in a predetermined range in the standard format is recorded.

Next, in step 202, the recording control data DCW is recorded in the recording manager area RMA.

Next, in step 204, the recording control data DCW as the predetermined data showing that it is finalized, is recorded in a predetermined area of the lead-in area LIA according to the standard format.

As described above, in the case where the finalizing processing is conducted, when the loaded disk 2 is the simple format, because the recording control data DCW is recorded automatically according to the standard format, the compatibility with the read only DVD is assured.

Further, after the disk is finalized once, when the data showing the simple format is recorded in a predetermined area in the lead-in area LIA, the disk can be restored again to the simple format.

As described above, according to the present embodiment, when the simple format is used, the delay time at the time of the recording start and the recording end can be greatly reduced. Accordingly, the operability can be increased.

Further, after the data recording is conducted by the simple format, when the finalizing processing is indicated, the disk in which the recording control data DCW is recorded by the simple format, is converted into the disk of the standard format, and the compatibility with the read only DVD can be secured. Further, after the disk is finalized once, the disk can also be restored again to the simple format in a short time.

According to the present invention as described above, because the present invention is provided with a data recording format of the simple format which records the recording control data smaller than in the standard format, the processing of the recording start and the recording end of the information originally to be recorded can be quickly conducted. As the result, the information recording and reproducing method and the information recording and reproducing apparatus in which the operability is excellent, can be provided for the user.

Further, when the finalizing processing is conducted, because the recording control data according to the standard format is recorded again to the information recording medium in which the information recording is conducted according to the simple format, the information recording medium which can be applied to the common information recording and reproducing apparatus can be easily realized.

What is claimed is:

1. A recording method of an information recording medium for recording information, comprising:

detecting a recording status of the information recording medium; and when the information is recorded according to a simple format, recording, in response to the detected recording status, a recording control data according to the simple format, whose recording amount is smaller as compared to a predetermined recording control data according to a standard format.

2. The recording method of the information recording medium according to claim 1, wherein the information recording medium includes a data recording area, a recording manager area, a lead-in area, and a lead-out area, each set according to the standard format; and the recording control data is recorded in the recording manager area and the lead-in area.

3. The recording method of the information recording medium according to claim 2, wherein in the lead-out area, the lead-out information for an integer times of an error correction unit block is recorded.

4. The recording method of the information recording medium according to claim 2, wherein lead-out information for 32 ECC blocks is recorded in the lead-out area when information is recorded according to the simple format.

5. The recording method of the information recording medium according to claim 1, wherein when the finalizing processing is conducted on the information recording medium in which information is recorded according to the simple format, the recording control data according to the standard format is recorded.

6. The recording method of the information recording medium according to claim 1, wherein when the information recording is indicated, the information in the delay time required up to the actual recording start of the information is temporarily held, and the held information is recorded from the start time of the actual recording.

7. An information recording apparatus which records information on an information recording medium, comprising:

means for recording the information on the information recording medium according to a standard format or a simple format;

a recording control data recording unit configured to record a recording control data according to the simple format, whose recording amount is smaller as compared to a predetermined recording control data according to the standard format, when the means for recording the information records information on the information recording medium according to the simple format.

8. The information recording apparatus according to claim 7, wherein the information recording medium includes a data recording area, a recording manager area, a lead-in area, and a lead-out area, each set according to the standard format; and the recording control data is recorded in the recording manager area and the lead-in area.

9. The information recording apparatus according to claim 8, wherein said recording control data recording unit records lead-out information in the lead-out area for 32 ECC blocks when information is recorded according to the simple format.

10. The information recording apparatus according to claim 7, further comprising:

a finalizing processing means for re-recording the recording control data according to the standard format on the information recording medium on which the information.

11. The information recording apparatus according to claim 7, further comprising:

an information storing means for temporarily holding the information in the delay time necessary up to the actual recording start of the information by the means for recording the information, when the information recording is indicated;

wherein the means for recording the information records the stored information from the start time of the actual recording.

12. An information recording apparatus which records information on an information recording medium, comprising:

a recording unit which records the information on the information recording medium according to a standard format or a simple format;

a recording control data recording unit configured to record a recording control data according to the simple format, whose recording amount is smaller as compared to a predetermined recording control data according to the standard format, when the recording unit records information on the information recording medium according to the simple format.

13. The information recording apparatus according to claim 12, wherein the information recording medium includes a data recording area, a recording manager area, a lead-in area, and a lead-out area, each set according to the standard format; and the recording control data is recorded in the recording manager area and the lead-in area.

14. The information recording apparatus according to claim 13, wherein said recording control data recording unit records lead-out information in the lead-out area for 32 ECC blocks when information is recorded according to the simple format.

15. The information recording apparatus according to claim 12, further comprising:

a finalizing processor which re-records the recording control data according to the standard format on the information recording medium on which the information had previously been recorded by the recording unit according to the simple format.

16. The information recording apparatus according to claim 12, further comprising:

an information storage unit for temporarily holding the information in the delay time necessary up to the actual recording start of the information by the recording unit, when the information recording is indicated;

wherein the recording unit records the stored information from the start time of the actual recording.

17. The method according to claim 1, wherein information is recorded according to the simple format when it is detected that the information recording medium is a blank disc at the detecting step.

18. The method according to claim 3, wherein in the lead-out area, a predetermined amount of lead-out information is recorded when information is recorded according to the simple format, and wherein the predetermined amount is smaller than an amount of lead-out information according to the standard format.

19. A recording apparatus which records information onto an information recording medium, comprising:

a detection unit which detects a recording status of the information recording medium, and a recording unit which, in response to the detected recording status, records control data according to a simple format, whose recording amount is smaller as compared to the predetermined control data according to a standard format.

20. The apparatus according to claim 19, wherein the recording unit records information according to the simple format when the detection unit detects that the information recording medium is a blank disc.

21. The apparatus according to claim 19, wherein the information recording medium includes a data recording area, a recording management area, a lead-in area, and a lead-out area, and wherein the control data is recorded in the recording management area and the lead-in area.

22. The apparatus according to claim 21, wherein the recording unit records lead-out information in the lead-out area for an integer times of an error correction unit block when information is recorded according to the simple format.

23. The apparatus according to claim 21, wherein the recording unit records lead-out information in the lead-out area for 32 BCC blocks when information is recorded according to the simple format.

24. The apparatus according to claim 21, wherein the recording unit records a predetermined amount of lead-out information in the lead-out area when information is recorded according to the simple format, and wherein the predetermined amount is smaller than an amount of lead-out information according to the standard format.

25. The apparatus according to claim 19, further comprising a finalization unit which conducts finalization processing on the information recording medium in which information is recorded according to the simple format, wherein the finalization processing includes recording of the control data according to a standard format.

26. The apparatus according to claim 19, further comprising a storage unit which temporarily stores information to be recorded, wherein when an information recording is instructed, the information in a delay time required up to actual recording start of the information is temporarily stored in the storage unit, and the stored information is recorded from the start time of the actual recording.

* * * * *